(12) United States Patent
Chen et al.

(10) Patent No.: US 7,483,584 B2
(45) Date of Patent: Jan. 27, 2009

(54) EXTENDED HYBRID VARIABLE LENGTH CODING OF TRANSFORM COEFFICIENTS FOR VIDEO COMPRESSION

(75) Inventors: Wen-hsiung Chen, Sunnyvale, CA (US); Fang Wu, Pleasanton, CA (US); Gregory D. Pelton, Raleigh, NC (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 910 days.

(21) Appl. No.: 10/898,654

(22) Filed: Jul. 22, 2004

(65) Prior Publication Data

US 2005/0276497 A1  Dec. 15, 2005

Related U.S. Application Data

(63) Continuation-in-part of application No. 10/869,229, filed on Jun. 15, 2004, now Pat. No. 7,454,076.

(51) Int. Cl.
*G06K 9/36* (2006.01)
*H03M 7/34* (2006.01)

(52) U.S. Cl. ........................ 382/245; 341/51
(58) Field of Classification Search ................. 382/245; 341/51
See application file for complete search history.

(56) References Cited

U.S. PATENT DOCUMENTS

| | | | | |
|---|---|---|---|---|
| 4,420,771 | A * | 12/1983 | Pirsch | 341/56 |
| 4,698,672 | A | 10/1987 | Chen et al. | 358/136 |
| 4,706,265 | A | 11/1987 | Furukawa | 375/122 |
| 4,813,056 | A | 3/1989 | Fedele | 375/27 |

(Continued)

FOREIGN PATENT DOCUMENTS

EP  0 266 049 A2  5/1988

(Continued)

OTHER PUBLICATIONS

G. Cote, B. Erol, M. Gallant, & F. Kossentini, "H.263+: Video Coding at Low Bit Rates" in *IEEE Transactions on Circuits and Systems for Video Technology*, vol. 8, No. 7, Nov. 1998.

(Continued)

*Primary Examiner*—Wenpeng Chen
(74) *Attorney, Agent, or Firm*—Dov Rosenfeld; INVENTEK

(57) ABSTRACT

A method and an apparatus of image compression, and a memory to store a data structure for compression. The method includes, for an ordered series of quantized coefficients of a transform of an image block, forming from the series events that are a run of non-zero-valued coefficients in a first contiguous region defined by a breakpoint, a run of zero-valued coefficients in the first region, or a run of zero-valued coefficients that ends in a non-zero-amplitude coefficient in a second region defined by the breakpoint. A codeword is formed for each runlength of non-zero-valued and zero-valued coefficients in the first region using a first and a second coding method, respectively, and, and encoding the runs of zero-valued coefficient that end in a non-zero value in the second region according to a third coding method, including providing an exception codeword when the ending amplitude is not 1.

65 Claims, 6 Drawing Sheets

U.S. PATENT DOCUMENTS

| | | | |
|---|---|---|---|
| 4,821,119 A | 4/1989 | Gharavi | 375/240.16 |
| 4,845,560 A | 7/1989 | Kondo et al. | 358/133 |
| 4,858,017 A | 8/1989 | Torbey | 358/426 |
| 4,920,426 A | 4/1990 | Hatori et al. | 358/433 |
| 4,922,510 A | 5/1990 | Brusewitz | 375/122 |
| 4,937,573 A | 6/1990 | Silvio et al. | 341/67 |
| 4,985,700 A | 1/1991 | Mikami | 341/59 |
| 4,985,766 A | 1/1991 | Morrison et al. | 358/133 |
| 5,006,930 A | 4/1991 | Stroppiana et al. | 358/133 |
| 5,045,938 A | 9/1991 | Sugiyama | 358/133 |
| 5,062,152 A | 10/1991 | Faulkner | 359/185 |
| 5,086,488 A | 2/1992 | Kato et al. | 382/56 |
| 5,128,758 A | 7/1992 | Azadegan et al. | 358/133 |
| 5,136,376 A | 8/1992 | Yagasaki et al. | 358/133 |
| 5,162,795 A | 11/1992 | Shirota | 341/67 |
| 5,166,684 A | 11/1992 | Juri et al. | 341/67 |
| 5,179,442 A | 1/1993 | Azadegan et al. | 358/133 |
| 5,226,082 A | 7/1993 | Kustka | 380/46 |
| 5,253,053 A | 10/1993 | Chu et al. | 358/133 |
| 5,253,055 A | 10/1993 | Civanlar et al. | 358/133 |
| 5,291,282 A | 3/1994 | Nakagawa et al. | 348/384 |
| 5,298,991 A | 3/1994 | Yagasaki et al. | 348/416 |
| 5,301,032 A | 4/1994 | Hong et al. | 358/261.2 |
| 5,307,163 A | 4/1994 | Hatano et al. | 348/415 |
| 5,319,457 A | 6/1994 | Nakahashi et al. | 348/387 |
| 5,337,087 A | 8/1994 | Mishima | 348/405 |
| 5,363,097 A | 11/1994 | Jan | 341/67 |
| 5,371,811 A | 12/1994 | Morrison et al. | 382/56 |
| 5,400,075 A | 3/1995 | Savatier | 348/384 |
| 5,402,244 A | 3/1995 | Kim | 358/261.2 |
| 5,446,744 A | 8/1995 | Nagasawa et al. | 371/37.4 |
| RE35,093 E | 11/1995 | Wang et al. | 348/413 |
| 5,475,501 A | 12/1995 | Yagasaki | 358/426 |
| 5,479,527 A | 12/1995 | Chen | 382/232 |
| 5,488,367 A | 1/1996 | Kitamura | 341/106 |
| 5,488,418 A | 1/1996 | Mishima et al. | 348/398 |
| 5,488,616 A | 1/1996 | Takishima et al. | 371/30 |
| 5,491,480 A | 2/1996 | Jan et al. | 341/67 |
| 5,528,628 A | 6/1996 | Park et al. | 375/240 |
| 5,539,401 A | 7/1996 | Kumaki et al. | 341/67 |
| 5,640,420 A | 6/1997 | Jung | 375/240 |
| 5,642,115 A | 6/1997 | Chen | 341/67 |
| 5,644,305 A | 7/1997 | Inoue et al. | 341/67 |
| 5,648,774 A | 7/1997 | Hsieh | 341/67 |
| 5,650,782 A | 7/1997 | Kim | 341/67 |
| 5,696,558 A | 12/1997 | Tsukamoto | 348/405 |
| 5,717,394 A | 2/1998 | Schwartz et al. | 341/67 |
| 5,731,836 A | 3/1998 | Lee | 348/402 |
| 5,740,283 A | 4/1998 | Meeker | 382/248 |
| 5,751,232 A | 5/1998 | Inoue et al. | 341/63 |
| 5,767,800 A | 6/1998 | Machida et al. | 341/67 |
| 5,767,908 A | 6/1998 | Choi | 348/403 |
| 5,774,594 A | 6/1998 | Kitamura | 382/239 |
| 5,793,432 A | 8/1998 | Mishima et al. | 348/403 |
| 5,793,897 A | 8/1998 | Jo et al. | 382/246 |
| 5,818,877 A | 10/1998 | Tsai et al. | 375/241 |
| 5,822,463 A | 10/1998 | Yokose et al. | 382/251 |
| 5,832,130 A | 11/1998 | Kim | 382/248 |
| 5,844,611 A | 12/1998 | Hamano et al. | 348/403 |
| 5,852,469 A | 12/1998 | Nagai et al. | 348/384 |
| 5,883,589 A | 3/1999 | Takishima et al. | 341/67 |
| 5,923,813 A | 7/1999 | Okamoto et al. | 386/109 |
| 5,956,153 A | 9/1999 | Hirabayashi | 358/433 |
| 5,982,437 A | 11/1999 | Okazaki et al. | 348/413 |
| 5,999,111 A | 12/1999 | Park et al. | 341/67 |
| 6,014,095 A | 1/2000 | Yokoyama | 341/67 |
| 6,104,754 A | 8/2000 | Chujoh et al. | 375/240 |
| 6,111,914 A | 8/2000 | Bist | 375/240 |
| 6,118,822 A | 9/2000 | Bist | 375/240 |
| 6,140,944 A | 10/2000 | Toyoyama | 341/63 |
| 6,144,322 A | 11/2000 | Sato | 341/67 |
| 6,198,848 B1 | 3/2001 | Honma et al. | 382/232 |
| 6,218,968 B1 | 4/2001 | Smeets et al. | 341/65 |
| 6,229,460 B1 | 5/2001 | Tsai et al. | 341/67 |
| 6,256,064 B1 | 7/2001 | Chujoh et al. | 348/240.23 |
| 6,278,801 B1 | 8/2001 | Boon | 382/246 |
| 6,304,607 B1 | 10/2001 | Talluri et al. | 375/240.27 |
| 6,339,386 B1 | 1/2002 | Cho | 341/67 |
| 6,388,588 B2 | 5/2002 | Kitamura | 341/67 |
| 6,404,929 B1 | 6/2002 | Boon | 382/233 |
| 6,408,029 B1 | 6/2002 | McVeigh et al. | 375/240.13 |
| 6,445,314 B1 | 9/2002 | Zhang et al. | 341/67 |
| 6,445,739 B1 | 9/2002 | Shen et al. | 375/240.03 |
| 6,477,280 B1 | 11/2002 | Malvar | 382/245 |
| 6,771,828 B1 | 8/2004 | Malvar | 382/240 |
| 2004/0228540 A1 | 11/2004 | Chen et al. | 382/246 |

FOREIGN PATENT DOCUMENTS

| | | |
|---|---|---|
| WO | WO 93/18616 | 9/1993 |
| WO | WO 03/090421 | 10/2003 |

OTHER PUBLICATIONS

T. Chujoh & Y. Kikuchi, "An improved variable length coding", *Joint Video Team (JVT) of ISO/IEC MPEG & ITU-T VCEG*, 2nd Meeting: Geneva, CH, Jan. 29-Feb. 1, 2002.

M. Luttrell, J. Wen, H. Yao, and J. Villasen: "Robust Low Bit Rate Wireless Video Communications," Final Report, Project 97-193, University of California MICRO project, available on http://www.ucop.edu/research/micro/97_98/97_193.pdf.

P.N. Tudor, "MPEG-2 Video Compression", IEE J Langham Thompson Prize, *Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videolocus.com.

"MPEG-1 Video Codec", pp. 1-8, available on http://www.cmlab.csie.ntu.edu.tw/cml/dsp/training/coding/mpeg1/.

K. Takagi, "Reversiblity of Code", *Joint Video Team (JVT) of ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J., and Jeong, J. "Huffman Coding of DCT Coefficients Using Dynamic Codeword Assignment and Adaptive Codebook Selection." *Signal Processing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

\* cited by examiner

Table 1

| Run length | 1 | 2 | 3 | 4 | 5 | 6 | . |
|---|---|---|---|---|---|---|---|
| Code | c1 | c2 | c3 | c4 | c5 | c6 | . |

FIG. 3A

Table 2

| Run length | 1 | 2 | 3 | 4 | 5 | 6 | . |
|---|---|---|---|---|---|---|---|
| Code | c'1 | c'2 | c'3 | c'4 | c'5 | c'6 | . |

FIG. 3B

Table 3

| Run length | 0 | 1 | 2 | 3 | 4 | 5 | . | Exc |
|---|---|---|---|---|---|---|---|---|
| Code | c"0 | c"1 | c"2 | c"3 | c"4 | c"5 | . | ESC" |

FIG. 3C

EXTENDED HYBRID VARIABLE LENGTH CODING OF TRANSFORM COEFFICIENTS FOR VIDEO COMPRESSION

RELATED PATENT APPLICATIONS

This invention is a continuation-in-part of U.S. patent application Ser. No. 10/869,229 to inventors Chen et al., filed Jun. 15, 2004 now U.S. Pat. No. 7,454,076 and titled A HYBRID VARIABLE LENGTH CODING METHOD FOR LOW BIT RATE VIDEO CODING. U.S. patent application Ser. No. 10/869,229 is incorporated herein by reference, and the methods described therein are each and collectively called the "Basic Hybrid VLC Method" herein.

BACKGROUND

The present invention is related to image compression, and in particular to variable length coding of a series of quantized transform coefficients of a block of image data.

Digital video compression ranges from coding still video/image to coding moving video for photographic, broadcasting, streaming, and conferencing applications. Modern transform based techniques include dividing an image into blocks, transforming the blocks of image data into transform coefficients, quantizing the coefficients, ordering the coefficients along a path, e.g., a zig-zag path on the two-dimensional transform domain, and encoding the series of quantized coefficients using a variable length coding method.

Two-dimensional variable length coding (2D-VLC) includes collecting or assuming the statistics of two dimensional block transform coefficient events that are each a run of the most-likely-to-occur amplitude, e.g., 0, followed by another amplitude. The coding includes assigning variable length codes, e.g., optimal codes such as Huffman codes or Arithmetic codes, to each event. In the description herein, 0 is assumed to be the most-likely-to-occur amplitude. The collecting or assuming statistics includes tracking the quantized non-zero-valued coefficient amplitudes and the number of zero-valued coefficients preceding the non-zero amplitude, i.e., tracking the runlengths of zeros which precede any non-zero amplitude along a specified path, e.g., a zigzag scan path for a block of coefficients, e.g., an n by n coefficient block.

Denote by Sij the likelihood expressed, for example, as a relative number of occurrences of an amplitude of i, i=1, 2, ... occurring after a run of j 0's, j=0, 1, 2, ... IN 2D-VLC, a variable length code such as an optimal code is assigned to each of the events that have such an Sij, with the most-likely-to-occur element—typically S10 for the case of encoding a block of transform coefficients in transform coding—having the shortest number of bits, and the least occurring event coded using the longest number of bits. The results of such coding may be tabulated as a table—a 2D-VLC table. Such a table provides the codeword, denoted Cij, used to encode the event of the combination of j consecutive 0-valued coefficients followed by a single non-zero coefficient of amplitude i, j=0, 1, ... and i=1, 2, ....

2D-VLC is used in common transform coding methods such as JPEG, MPEG1, MPEG2, ITU-T-261, etc., as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a 2D-VLC table. Typically, interframe and intraframe images have different 2D-VLC tables. The DC component is typically separately encoded. Furthermore, the 2D-VLC table may be truncated so that the least frequently occurring events use an escape code followed by a fixed length code. A special "EOB" code is used to indicate the end of block when all remaining coefficients are zero.

Still images are similarly encoded, e.g., in the same manner as an intraframe image for motion video.

FIG. 1 shows how a table lookup may be used to implement a 2D-VLC scheme. Prior to the table look up, the runlength of zero amplitudes preceding any non-zero amplitude and the non-zero amplitude are determined. The table look up uses a 2D table for those likely events encoded using variable length encoding. An escape code together with a fixed length codes is used for relatively less likely-to-occur combinations The advantage of 2D_VLC is that both the position of each non-zero-valued coefficient as indicated by the runlength, and the quantized amplitude value are coded simultaneously as a pair using one 2D-VLC table. This may result in shorter codes, i.e., codes that use fewer bits than using separate VLC tables for each non-zero-valued coefficient and for its amplitude.

Because of the widespread use of image coding, many patents have been issued on different forms of VLC. U.S. Pat. No. 4,698,672 issued Oct. 6, 1987 to Wen-hsiung Chen, one of the inventors of the present invention, for example described one form of a two-dimensional variable length coding method.

Extensions and variations to the common 2D-VLC method are known. For example, the ITU H.263 compression standard defines one such variation sometimes called three-dimensional VLC (3D-VLC). See PCT patent publication WO 9318616 published Sep. 16, 1993 titled PICTURE DATA ENCODING METHOD and also the ITU-T H.263 standard. In 3D-VLC, each symbol ("event") is a triplet (LAST, RUN, LEVEL) that includes: LAST, a binary flag that indicates whether or not the current non-zero amplitude-value is the last non-zero coefficient in the block, RUN, the run-length of zero-value coefficients that precede the current non-zero amplitude, i.e., the number of zeroes since the last non-zero coefficient amplitude, and LEVEL, the current non-zero coefficient amplitude value. Thus, there is no need for a separate EOB codeword; whether or not the non-zero coefficient is the last one is incorporated into the event.

FIG. 2 shows how a table lookup may be used to implement 3D-VLC.

One deficiency of 2-D VLC methods is that every non-zero-valued coefficient needs to be accompanied by one runlength to identify its position. In block based transform coding, it may occur that there are a number of consecutive non-zero-valued coefficients along the predetermined coding path. This may especially occur in intraframe coding and high bit rate interframe coding. The 2D-VLC method requires a separate runlength code, e.g., C10, C20, C30 ..., etc., for each of the consecutive non-zero coefficient. Thus there is a need in the art for a method that provides for efficiently encoding a sequence of consecutive non-zero coefficient values.

U.S. patent application Ser. No. 10/342,537 to inventors Chen et al., filed Jan. 15, 2003 and titled AN EXTENSION OF TWO-DIMENSIONAL VARIABLE LENGTH CODING FOR IMAGE COMPRESSION describes what is called the "Extended 2D-VLC Method" that includes encoding repetitions of some non-zero coefficient values. U.S. patent application Ser. No. 10/342,537 is incorporated herein by reference, and the methods described therein are each and collectively called the "Extended 2D-VLC Method" herein.

One variant of the Extended 2D-VLC method provides codes for all the possible amplitude variations of consecutive coefficients that follow a set of zero-valued coefficients. This effectively reduced the runlength to 1 for all cases. The difficulty of this approach is that there are enormous numbers of patterns that can be generated from the amplitudes of consecutive coefficients. For example, with 32 quantization levels as defined in many common video coding standards, there are in the order of $32^n$ patterns that can be generated from n consecutive coefficients. As such, in practical implementation, only a limited number of most frequently appearing non-zero amplitude values such as 1 and 2 and, a limited number of lengths of consecutive non-zero-values, such as 3 or 4 consecutive values are regrouped for pattern matching.

Thus, there still may be inefficiency in using the called "Extended 2D-VLC Method' in practice.

The above-referenced Basic Hybrid VLC Method of U.S. patent application Ser. No. 10/869,229 was invented as a result of the observation that there is an additional statistic that may have been overlooked in prior art variable length coding methods. Non-zero-valued quantized transform coefficients along the path tend to cluster more in the low frequency region and are more scattered in the high frequency region. That is, runs of non-zero values are more likely to occur in lower spatial frequencies than in higher spatial frequencies. The Basic Hybrid VLC Method encodes position and amplitude of transform coefficients separately to take advantage of this clustered nature of coefficients in the low frequency region and scattered nature in the high frequency region. Two types of runlength coding schemes are used. The Basic Hybrid VLC Method further takes advantage of the likelihood of having several consecutive non-zero-valued coefficients in the clustered low frequency region. In such a case, a single runlength would be used for the run of non-zeroes instead of a number of runlength codes for each of the different amplitudes, as would occur with traditional 2D-VLC.

In one embodiment, the Basic Hybrid VLC Method includes establishing a breakpoint along the path of the ordering of the coefficients to identify a first, e.g., low-frequency region and a second, e.g., high frequency region. The encoding of low frequency coefficients includes coding the positions of consecutive non-zero-valued coefficients and consecutive zero-valued coefficients using runlength coding methods of the first kind and second kind, respectively. The method further includes coding the amplitude values of the non-zero-valued coefficients in runs of non-zero-valued coefficients in the first region. The method further includes coding the runs of non-zero-valued coefficients using a runlength coding method of the third kind in the second, e.g., high-frequency region. The method further includes coding the amplitude values of the non-zero-valued coefficients in the second region. Thus, different runlength coding methods are used in the low frequency and high frequency regions. At most, five independent coding tables may be used: two runlength and a first amplitude table for low frequency coefficients and one runlength and a second amplitude table for the high frequency coefficients. The code lengths and code tables may then be shorter than that of a typical 2D-VLC table.

The above-referenced Basic Hybrid VLC Method still may be improved by looking more deeply into the nature, e.g., distribution of the coefficients in the regions. In particular, it is known that motion compensation techniques are improving, such that there may be significant runs of zero-values, and that non-zero quantized coefficient values may be dominated by a few relatively low amplitude values such as 1 and 2. Furthermore, in the high frequency region, there frequently may only be non-zero coefficients of value 1.

Thus there is still a need in the art for a method that improves on the above-referenced Basic Hybrid VLC Method by efficiently taking into account the higher likelihood of only non-zero value-1 coefficients in the high frequency region of an ordered series of quantized transform coefficients of blocks of an image.

One or more patents describing some existing 2D-VLC coding methods have recently been the subject of patent litigation. Thus, there is a need in the art for alternate methods that can replace commonly used 2D-VLC methods that have been the subject of such litigation.

SUMMARY

Provided herein is a method of encoding an ordered series of quantized coefficients of a transform of a block of image data. The method includes providing a breakpoint defining a first contiguous region of more than one coefficient along the ordering of the series followed by a second continuous region. The method further includes encoding the ordered sub-series of quantized coefficients in the first region, including using a first variable length coding method, and encoding the ordered sub-series of quantized coefficients in the second region, including using a second variable length coding method. The first and second variable length coding methods are such that the encoding of at least some of the coefficients in the first region is different than the encoding of at least some of the coefficients in the second region.

In one embodiment, the method includes establishing a breakpoint along the path of the ordering of the coefficients to identify a first, e.g., low-frequency region and a second, e.g., high frequency region. The encoding of low frequency coefficients includes coding the positions of consecutive non-zero-valued coefficients and consecutive zero-valued coefficients using runlength coding methods of the first kind and second kind, respectively. The method further includes coding the amplitude values of the non-zero-valued coefficients in runs of non-zero-valued coefficients in the first region. The method further includes coding the runs of zero-valued coefficients that end in a single non-zero-amplitude coefficient in the second region using a runlength coding method of the third kind, the coding method of the third kind assuming that the non-zero-amplitude at the end of the run is of amplitude 1 and providing a codeword to indicate the case of the non-zero-amplitude at the end of the run being of amplitude other than 1. In the case of the non-zero-amplitude at the end of the run being of amplitude other than 1, the method further includes coding the amplitude value of any ending non-zero-amplitude coefficient that has amplitude other than 1 in the second, e.g., high-frequency region.

The invention takes into account the observed clustered nature of non-zero valued transform coefficients in the low frequency region and the observed relatively more scattered nature of transform coefficients in the high frequency region by using different runlength coding methods in the low-frequency and high frequency regions. The method further takes into account that any non-zero amplitude in the high frequency region is likely to be 1. At most, five independent coding tables may be used: two runlength and a first amplitude table for low frequency coefficients and one runlength and a second amplitude table for the high frequency coefficients that have amplitude other than one, and thus are exceptional in the second, e.g., high-frequency region. The code lengths and code tables may then be shorter than that of a typical 2D-VLC table.

Furthermore, escape codes, common in 2D-VLC, may be avoided.

It should be noted that no overhead bits are needed to address the usage of the five independent tables.

Embodiments are presented as a method of encoding. Another embodiment is presented as a method of decoding. Yet another embodiment is presented as an apparatus for coding. Yet another embodiment is presented as an apparatus for decoding. Yet another embodiment is presented as a memory storing a data structure of codewords. Yet another embodiment is presented as a carrier medium carrying instructions to instruct a processor to carry out an encoding method.

One method embodiment is for processing an ordered series of digital signals that each have an amplitude from a finite set of amplitudes consisting of the most-likely-to-occur amplitude and at least one other amplitude. The processing is to reduce the amount of data used to represent the digital signals and to form codewords such that the more likely to occur sequences of values of digital signals are represented by relatively short codewords and the less likely to occur sequences of values of digital signals are represented by relatively long codewords.

The method includes for each run of consecutive signals of value or values other than the most-likely-to-occur value occurring in a first contiguous region defined by a breakpoint along the ordering of the series, encoding the runlength of the consecutive signals using a first runlength coding method, and forming a codeword that encodes the runlength using the first runlength coding method and further encodes the amplitudes and signs of each signal in the run, the breakpoint defining the first continuous region and a second contiguous region following the first contiguous region.

The method further includes for each run of consecutive signals of the most-likely-to-occur value occurring in the first region defined by the breakpoint, encoding the runlength of the consecutive signals of the most-likely-to-occur value using a second runlength coding method.

The method further includes encoding the signals occurring in the second region defined by the breakpoint, the encoding using a second-region coding method, the second-region coding method including: identifying events that include runs of consecutive signals of the most-likely-to-occur value in the second region that end in a value other than most-likely-to-occur value, and encoding said identified events in the second region using a third coding method.

The first, second, and third coding methods include variable length codes such that relatively short codewords are formed to represent sequences of values that are relatively more likely to occur, and relatively long codewords are formed to represent sequences of values that are relatively less likely to occur.

In one embodiment of the method, the series of digital signals is a series of quantized coefficients of a transformed block of image data, the transform such that the most-likely-to-occur amplitude is 0.

Other features, properties, and aspects will be clear from the drawings, description, and claims.

BRIEF DESCRIPTION OF THE DRAWINGS

FIGS. 3A and 3B respectively, show runlength code tables for runs of consecutive non-zero-valued coefficients and runs of consecutive zero-valued coefficients, according to an embodiment of the invention.

FIG. 3C shows a runlength code table for runs of consecutive zero-valued coefficients that end in a non-zero-amplitude, with an exception code for when the non-zero-amplitude is greater than 1, according to an embodiment of the invention.

DETAILED DESCRIPTION

Figure 1:
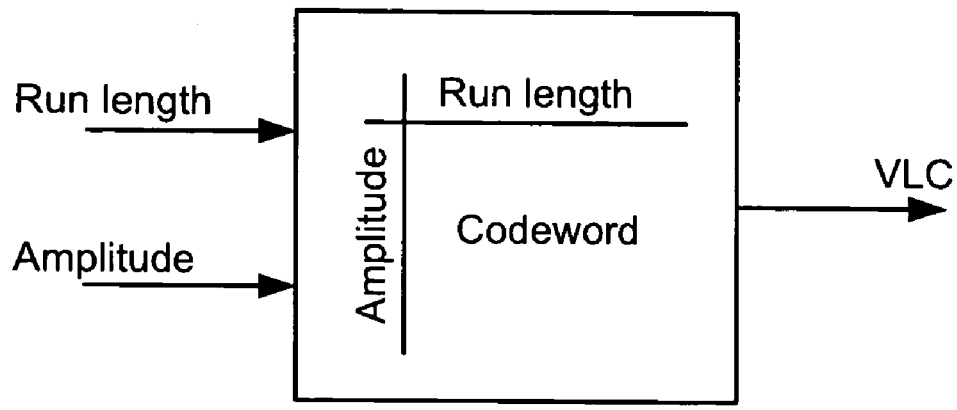
FIG. 1 shows how a prior art 2-D VLC method may be implemented by a table look-up.
Figure 2:
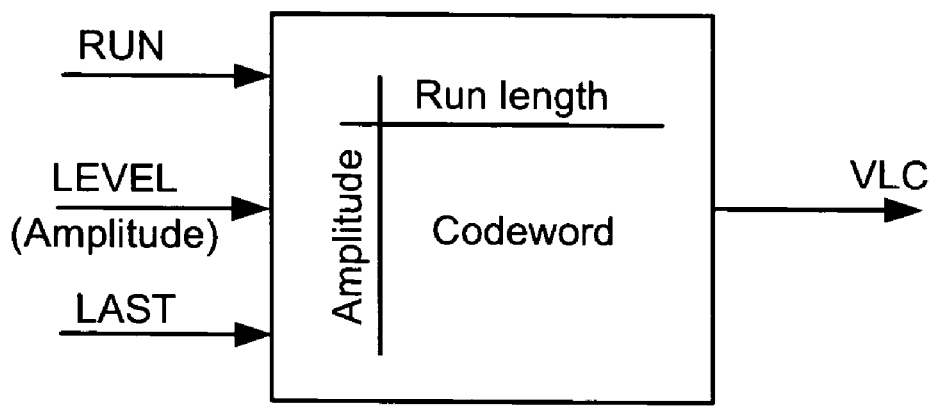
FIG. 2 shows how a common prior art variation of 2-D VLC called 3D-VLC may be implemented by a table look-up.

Described herein are a variable length coding method and an apparatus for coding transform domain coefficients as encountered in video coding. The coding method is expected to comparable to if not better than traditional 2D-VLC coding. It can potentially be used to replace existing 2D-VLC coding methods. The method described herein is further designed to be an improvement on the above-referenced Basic Hybrid VLC Method.

The present invention relates to encoding an ordered series of digital signals that each have an amplitude from a finite set of amplitude values. Each signal may also have a sign, i.e., be either positive or negative. The set of amplitude values include one most-likely-to-occur amplitude and at least one other amplitude. The application discussed herein is for the ordered series of signals being the ordered set of quantized coefficient values of a block of image data after transformation by a transform such as the DCT or some other common transform, after quantization to a finite number of values, and after ordering along a predefined path, e.g., a zigzag path. The ordering of the series is typically in order of increasing spatial frequency. The most-likely-to-occur value, e.g., the most frequently occurring value is typically 0.

The Basic Hybrid VLC Method and Aspects Common to the Present Invention

The above-referenced Basic Hybrid VLC Method of U.S. patent application Ser. No. 10/869,229 was invented as a result of the observation that there is an additional statistic that may have been overlooked in prior art variable length coding methods. Non-zero-valued quantized transform coefficients along the path tend to cluster more in the low frequency region and are more scattered in the high frequency region. That is, runs of non-zero values are more likely to occur in lower spatial frequencies than in higher spatial frequencies.

One aspect of the present invention and of the Basic Hybrid VLC Method is that a breakpoint is used along the ordering of the series to define a first region, e.g., the region before the breakpoint, and a second region, e.g., the region after the breakpoint. Thus, for example, for an 8 by 8 block, there may be a breakpoint between 21 and 22, such that the first 21 coefficients in the ordered series are in the first region, and the last 43 coefficients starting with the 22nd coefficient in the ordered series are in the second region. The breakpoint itself may also be in the region. Thus, for example, for an 8 by 8 block, there may be a breakpoint at 22, such that the first 21 coefficients in the ordered series are in the first region, and the last 43 coefficients starting with the 22nd coefficient in the ordered series are in the second region. Furthermore, the breakpoint may define how the regions are formed, but may not correspond to the actual boundary between the first and second region. See below for a description of a soft vs. a hard boundary defined by the same breakpoint.

Another aspect of the present invention and of the Basic Hybrid VLC Method is that a first coding method is used to encode data that occurs in the first region, while another method is used to encode data in the second region. Yet another aspect of the present invention and of the Basic Hybrid VLC Method is the selection of the breakpoint. Yet another aspect of the present invention and the Basic Hybrid VLC Method is how the breakpoint is used. In one version, the breakpoint defines a hard boundary between the first and second region, so that, for example, a sequence of consecutive non-zero-valued coefficients that crosses the breakpoint is regarded as a first sequence up to the breakpoint, and a second sequence after the breakpoint. In another version, the breakpoint defines a boundary that is soft, so that any sequence of consecutive values, e.g., consecutive zero-values, or consecutive non-zero-values that starts prior to the breakpoint and crosses the breakpoint is regarded as a sequence that occurs in the first region. For such a block that includes such a sequence that crosses the breakpoint, the effective boundary starts after the end of the sequence, so that the effective boundary defined by a breakpoint may change from sequence to sequence.

For each run of non-zero valued coefficients—in general, for each run of coefficients having values other than the most-likely-to-occur value—one aspect of the present invention and of the above-referenced Basic Hybrid VLC Method encodes the runlength of the run using a first run length encoding method, and encodes the sequence of amplitudes in the run, including any signs. Each run of zero-valued coefficients—in general, each run of coefficients having the most-likely-to-occur value—is encoded using a second runlength coding method. Thus, two types of runlength codes are alternately used in the first region.

In one embodiment of the present invention arid of the Basic Hybrid VLC Method, the codewords for the coefficients in the first region start with a codeword of the first coding method and alternate between the first coding method and the second coding method. To provide for the case that the first run encountered is a run of zeroes, one of the codewords of the first coding method is a particular codeword to indicate that indeed the first run encountered is a run of zeroes such that a codewords of the second method follows the particular codeword of the first method.

The present invention extends how the coefficients of the second region are encoded to take into account the likelihood, for example in low-bit rate interframe coding, that most of the non-zero coefficients in the second region are of value 1.

FIGS. 3A and 3B respectively, show runlength code tables—Table 1 with reference numeral 301 and Table 2 with reference numeral 302—for runs of consecutive non-zero-valued coefficients and runs of consecutive zero-valued coefficients, respectively $c_i$ and $c'_i$, respectively denote the codes for runs of i consecutive non-zero-valued coefficients and zero-valued coefficients, respectively, where i is the runlength: i=1, 2, . . . .

As an example, assuming the ordered series of quantized coefficients along the ordering path in the first frequency region starts with:

2 3 2 –1 0 1 2 0 0 1 –1 1 0 0 . . .

To determine the runlengths, this series may be written as:
N N N N 0 N N 0 0 N N N 0 0 . . .

where N represents any non-zero-valued coefficient and 0 represents a zero-valued coefficient.

Denote by $r_i$ the run of i consecutive non-zero coefficients, and $r'_i$ the run of i consecutive zero-valued coefficients. The ordered sequence of the example then starts with:

$r_4$ $r'_1$ $r_2$ $r'_2$ $r_3$ $r'_2$ . . .

The result of encoding the runlengths but not amplitudes of this pattern can then be written as:

$c_4$ $c'_1$ $c_2$ $c'_2$ $c_3$ $c'_2$ . . .

To complete the first-region coding method, included with the codeword of each run of non-zero-valued coefficients are codewords for each amplitude in the run, and further bits for the sign of each coefficient for transform whose coefficients can be positive or negative, e.g., the commonly used DCT transform. In one embodiment, the amplitudes are each encoded using a variable length code, and the signs are each encoded using a sign bit. Denote by $A_k$, k=1, 2, 3, . . . the variable length amplitude codes for amplitudes 1, 2, . . . respectively, denote by $S_+$ and $S_-$ the sign bit codes for positive and negative coefficients, respectively, and denote concatenation by +. The example sequence above is then encoded as follows:

$(c_4+A_2+S_++A_3+S_++A_2+S_++A_1+S_-)+c'_1+(c_2+A_1+S_++A_2+S_+)+c'_2+(c_3+A_1+S_++A_1+S_-+A_1+S_+)+c'_2$ . . .

In one embodiment, the DC component is separately sent, such that the first coefficient in the first region is the first non-DC coefficient along the ordering.

In one embodiment, it is assumed that the series starts with a run of one or more non-zero-valued coefficients. Therefore, the first codeword is always a codeword from the coding method of the first kind. A code is included for when the series starts with a run of one or more zeros to indicate that the first code used is the code for runs of zeroes.

Thus, for example, indicating by RP the codeword in the coding method of the first kind that indicates that the first region starts with a run of one or more zero-valued coefficients, suppose the series of coefficients in the first region starts with:

0 2 3 2 –1 0 1 2 0 0 1 –1 1 0 0 . . .

In one embodiment, the codewords for this first region part is:

$RP+c'_1+(c_4+A_2+S_++A_3+S_++A_2+S_++A_1+S_-)+c'_1+(c_2+A_1+S_++A_2+S_+)+c'_2+(c_3+A_1+S_++A_1+S_-+A_1+S_+)+c'_2$ . . .

In another embodiment, a codeword is included in the coding method of the first kind that indicates that the series has no non-zero values. In another embodiment, such a codeword is also used to indicate that all remaining coefficients in the first region are zero. This codeword is called skip-to-boundary (SKP) herein.

The Second Region.

An aspect of the present invention is that in the second region, a second-region coding method is used that takes into account the occurrence of runs of zero-valued coefficients that end in an amplitude 1 coefficient. The second-region coding method includes identifying events that include runs of consecutive signals of the most-likely-to-occur value, e.g., zero-valued coefficients in the second region that end in the next-most-likely to occur amplitude, e.g., one, and encoding the identified events in the second region using a third coding method.

One embodiment of the second-region coding method includes, starting at the beginning of the second region, identifying the runs of zero-valued coefficients that end in a nonzero-amplitude coefficient, and encoding the runlengths of each run of zero-valued coefficients that end in the non-zero-amplitude using a third runlength coding method that provides a code for each run, such as a code represented by the runlength table shown in FIG. 3C as Table 3 (reference numeral 303), where c"i, i=0, 1, 2, ... represents the runlength code used to encode a runlength of i consecutive 0's ending in 1. Table 3 (303) also includes a code to indicate when the ending non-zero-amplitude is other than the next-most-likely to occur, e.g., whose amplitude is greater than 1, i.e., for the case of the run being of consecutive coefficients of the most-likely to occur amplitude, e.g., 0, that ends in a coefficient whose amplitude is other than the next-most-likely to occur, e.g., whose amplitude is greater than 1. Because such events are regarded as not very likely, we call them "exceptions." An exception is indicated as Exc in Table 3 (303). Such an exception is encoded according to an aspect of the invention by the codeword as if the run of 0's ended in 1 followed by a second escape code, denoted ESC", followed by an encoding of the amplitude.

Another aspect of the invention is that an end code, denoted EOB herein, is used to indicate that the remaining coefficients in the second region are all zero.

As an example, suppose the ordered series quantized coefficients along the pre-determined path for the second region is:

0 0 0 1 0 0 2 –1 0 0 0 0 0 1 0 0 ... 0.

Denote by r"i the run of i consecutive zero-valued coefficients that end in amplitude 1, and by r"i+Exc the run of i consecutive zero-valued coefficients that end in a non-zero amplitude greater than 1, with i=0, 1, 2, ... In one embodiment, each non-zero valued coefficient in the series of the second region is assumed to be preceded by a run of zero-valued coefficients, so that the second of two consecutive non-zero-valued coefficients is preceded by a run of non-zero-valued-coefficients (i=0). The runs of the series of the second region may then be written as:

r"3 (r"2+Exc) r"0 r"5 EOB.

where EOB is used to indicate that the remaining coefficients are all 0, and in which it is understood that there is exactly one non-zero-valued coefficient between each run of 0's. If quantized coefficients along a specified path in the second region are of values greater than one then in one embodiment, the encoding process includes a variable length amplitude code after the runlength code and the exception code to encode the amplitude of the non-zero-valued coefficient, and a sign code for the non-zero-valued coefficient that follows the run of 0's. Denote by A"k, k=2, 3, ... the variable length amplitude codes for amplitudes 2, 3, ... respectively, denote by $S_+$ and $S_-$ the sign bit codes for positive and negative coefficients, respectively, and denote concatenation by +. Using the codes of Table 3 (303) for the runlengths, the result of encoding the runs in the series of the second region is then:

(c"3+$S_+$)+(c"2+ESC"+A2+$S_+$)+(c"0+$S_-$)+(c"5+$S_+$)+ EOB, where EOB is also used here to denote the codeword to indicate the remaining coefficients are zero-valued, and ESC" is the escape code for the exception in the second region.

The above-referenced Basic Hybrid VLC Method would have included an amplitude code for those non-zero-valued coefficients of amplitude 1. Therefore, so long as the non-zero quantized coefficient values in the second region are predominantly ±1, this performance of this embodiment of the present invention should be superior to the corresponding version of the Basic Hybrid VLC Method.

Note that in one embodiment, the amplitude coding method (the A"i values, i=2, 3, ...) for quantized coefficient amplitudes that occur in the second region is different from the amplitude coding (the Ai values, i=1, 2, ...) for quantized coefficient amplitudes that occur in the first region. It is expected, for example, that the amplitudes in the second region, e.g., the high-frequency region, would be dominated by lower values than the amplitudes that occur in the first region, e.g., the low frequency region, for typical images.

The above-described improvement to the Basic Hybrid VLC Method would likely be superior for low-bit-rate motion compensated coding. It may also be useful for higher bit-rate interframe coding as better motion compensation techniques are developed.

The following section is applicable to the present invention and to the above-referenced Basic Hybrid VLC Method.

The Breakpoint Defining the Two Regions

One version uses a fixed breakpoint between the first, e.g., low frequency region, and the second, e.g., high frequency region. In one embodiment, the fixed breakpoint is pre-determined for each type of image and for each type of compression method by running experiments collecting statistics on a set of typical samples of such images. Typically, different breakpoints are determined for:

intraframe and still image coding vs. interframe coding;

standard definition television images (SDTV) vs. HDTV images;

high bit rate coding methods vs. low bit rate coding methods;

DCT vs. non-DCT transforms;

and so forth.

When fixed, e.g., pre-selected breakpoints are used, there is already an indication passed on to the decoder to indicate the type of image, e.g., whether interframe or intraframe, or the type of coding, high-bit-rate or low-bit-rate. Thus, there is typically no need to send a further indication to the decoder of the breakpoint. In one embodiment, a first breakpoint is used for interframe data that is for a first kind of interframe coding, e.g., relatively high-bit-rate interframe coding, and a second breakpoint is used for interframe data that is for a second kind of interframe coding, e.g., relatively low-bit-rate interframe coding.

The inventors performed experiments on typical still images—applicable also to intraframe images in motion coding—by performing variable length coding according to embodiments of the present invention, and plotting the size of the compressed image for different breakpoint values for the case of 8 by 8 blocks quantized to 127 non-zero amplitudes using the DCT, and observed that a breakpoint of 22 worked for most images, although some images worked well with a breakpoint of about 10. Therefore, in one embodiment for intraframe and still images for DCT transform coding, a pre-selected fixed breakpoint of 22 was used.

In a first variation, the breakpoint is image dependent and selected from a finite set according to a breakpoint selection criterion. For example, from the above-described experiments, the compression using a first breakpoint of 22 was compared to the compression using a second breakpoint of 10, and the breakpoint that gave the higher compression used. Other breakpoint selection criteria are also possible, e.g., by looking at the statistics of runs of zero-valued coefficients and non-zero-valued coefficients.

When such an image-dependent breakpoint is used, an indication of the breakpoint is also sent with each set of coefficients. In one embodiment, a 2-bit indication is sent. This provides for each block to be encoded using one of 4 pre-defined breakpoints. In an alternate embodiment, the indication of which pre-defined breakpoint is sent as a variable length code such that more common breakpoints are encoded by a shorter code.

While typically, the set of possible breakpoints is a small subset of the possible positions in the series, in yet another variation, the image dependent breakpoint is selected from anywhere in the series, or, in an alternate variation, from anywhere along a sub-range.

When the breakpoint defines a fixed boundary between the first and second region, this boundary is called a "hard" boundary herein. Similarly, a set of breakpoints may define a set of hard boundaries. With a hard boundary, a sequence of consecutive non-zero values or a sequence of consecutive zero-valued coefficients that crossed the breakpoint would be regarded as a first sequence in the first region up to the breakpoint, and a second sequence in the second region from after the breakpoint.

In an alternate embodiment, the breakpoint defines what is called herein a "soft" boundary in that any sequence of consecutive zero, or non-zero values that started in the first region would be encoded in the first region even if it crossed the breakpoint. Thus, the actual boundary for a particular block of coefficients might extend beyond the breakpoint. For example, consider the following ordered series of digital signals of coefficients:

2 3 2 −1 −1 1 1 1 −1 1 0 2 0 0 1 −1 1 0 0 . . .

And suppose a breakpoint of up to and including 7 is used.

In one embodiment, the breakpoint forms a hard boundary. In such a case, the first region is:

2 3 2 −1 −1 1 and the second region is:

1 −1 0 1 2 0 0 1 −1 1 0 0 . . .

So that the coding of the first region is:

$c7+A2+S_++A3+S_++A2+S_++A1+S_-A1+S_-+A1+S_++A1+S_+$ and the coding of the second region is:

$(c"0+S_+)+(c"0+S_-)+(c"1+S_+)+(c"0+ESC"+A"2+S_+)+(c"2+S_+)+(c"0+S_-)+(c"0+S_+)+\ldots$ In another embodiment, the breakpoint defines a soft boundary. In such a case, for this particular block, the first region is:

2 3 2 −1 −1 1 1 1 −1 and the second region is:

0 1 2 0 0 1 −1 1 0 0 . . .

So that the coding of the first region is:

$c9+A2+S_++A3+S_++A2+S_++A1+S_{31} \quad +A1+S_-+A1+S_++A1+S_++A1+S_++A1+S_-$ and the coding of the second region is:

$(c"1+S_+)+(c"0+ESC"+^+A"2+S_+)+(c"2+S_+) \quad +(c"0+S_-) + (c"0+S_+)+\ldots$

That is, for the second embodiment, the breakpoint of 7 corresponds to a boundary of 9 for this particular block.

Sample Code Tables: the Runlength Codes and Amplitude Codes

The runlength codes for the coding methods of the first kind, the second kind, and the third kind for runlengths can be arithmetic codes or Huffman variable length codes. Different types of images may be examined experimentally and statistics collected for such images on the different runlengths to be encoded. The codes are then assigned based on such statistics.

Similarly, two amplitude codes, one for non-zero amplitudes in the first region, and another for amplitudes greater than 1 in the second region are constructed, e.g., as arithmetic codes or Huffman variable length codes.

Thus there are three runlength codes, and these may be presented in the form of three runlength coding tables. There further are two amplitude coding tables. Thus, one embodiment uses five tables.

Multiple Breakpoints and More Than Two Regions

The above embodiments are in terms of a single breakpoint, and two regions in the ordering. The idea may be extended to more than two regions, i.e., more than one breakpoint. For example, one embodiment includes a first, low frequency region where it is reasonably likely that there are runs of zero-valued coefficients and runs of non-zero coefficients of value one or more, a second, mid-frequency region where it is reasonably likely that there are runs of zero-valued coefficients, and runs of coefficients of value one, but where there is not likely to be runs of coefficients greater than one, and a third high-frequency region where it is reasonably likely that there are runs of zero-valued coefficients, but not many runs of non-zero-valued coefficients. Thus, one alternate run length coding method includes using two breakpoints to define a first, second, and third region. In the first region, runs of non-zero-valued coefficients and runs of zero-valued coefficients are identified, and the runlengths of the non-zero and zero-amplitude coefficients are encoded using a first runlength coding method and a second runlength coding method. In the second region, runs of coefficients of amplitude-one, and runs of zero-valued coefficients are identified, and the runlengths of the amplitude-one and zero-amplitude coefficients are encoded using a third runlength coding method and a fourth runlength coding method, respectively. In the third region, runs of zero-valued coefficients are identified, and the runlengths of such zero-valued-runs are encoded using a fifth runlength coding method.

Other schemes such as 2D-VLC and extended 2D_VLC also may be used in some of the regions.

Apparatus

Another aspect of the invention is an apparatus for coding a series of digital signals, e.g., an ordered series of quantized coefficients of a transformed block of image data.

Figure 4:
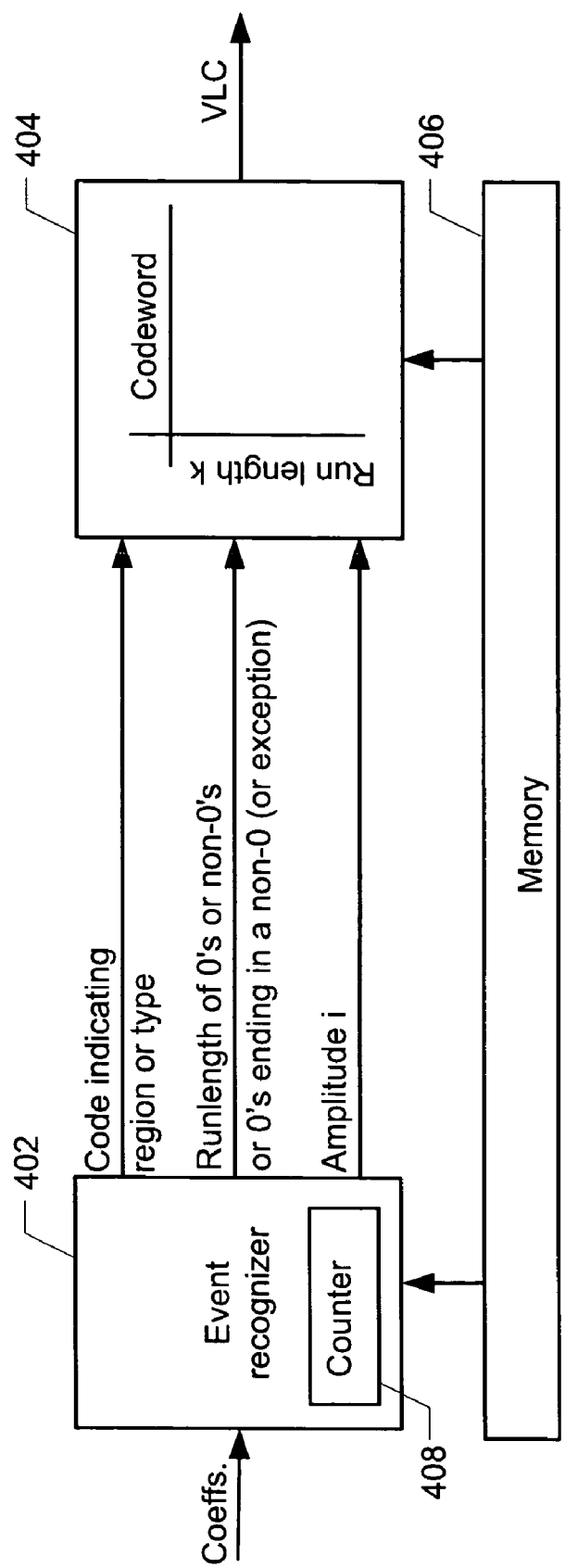
FIG. 4 shows a simplified block diagram of one embodiment of an apparatus to code a series of quantized transform coefficients.

FIG. 4 shows one embodiment of an apparatus for encoding according to the VLC tables described herein. One embodiment, uses three lookup tables such as a table for the codes for runs of non-zeroes in the first region, a table for the codes for runs of zeroes in the first region, and a table for the codes for runs of zeroes that end in an amplitude of 1 in the second region. These tables, e.g., the tables for the codes for the first region, and the table or tables for the code in the second region are stored in a memory 406. A counter 408, in an event recognizer 402, counts the coefficient number in the order of the series, and thus provides for the event recognizer 402, whether or not an event is in the first or the second region by determining whether or not the coefficient is before or after the breakpoint, also stored in the memory 406. The event recognizer 402 determines the runlength of consecutive zero amplitude coefficients, and the runlength of consecutive zero-length amplitudes when in the first region, and the runlength of zero amplitude coefficients that end in amplitude 1, or in another amplitude when in the second region. For the first region, the runlength of zeroes (zeroes or non-zero) are passed together with the amplitudes (0 or non-zero). In one embodiment, a code is further passed to indicate when the values are in the second region. These output(s) of the event recognizer 402 are input to an encoder 404 that in one embodiment includes a lookup device to look up the appropriate one of the five code tables used.

While the embodiment shown in FIG. 4 has the memory 406 that stores the lookup tables separate from the lookup device, in another embodiment, the lookup device includes a memory for storing the code tables.

An alternate embodiment of FIG. 4 includes in the code generated by the event recognizer 402 an indication of whether or not the coefficient is the last coefficient in the block. This provides for an extension similar to that of traditional 3-D VLC as described in above-mentioned PCT patent publication WO 9318616.

Figure 5:
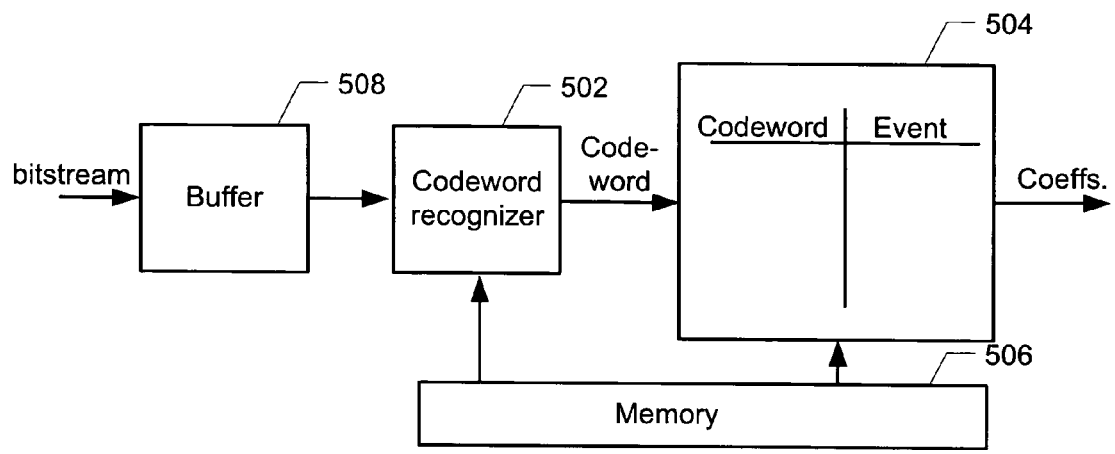
FIG. 5 shows a decoding apparatus according to an embodiment of the invention.

Another aspect of the invention is an apparatus for decoding a bitstream encoded by any of the novel methods described herein. FIG. 5 shows one embodiment of the apparatus. A codeword recognizer 502 accepts the bits of a bitstream and recognizes a codeword of a set of possible codewords that each represents an event. The codeword recognizer determines which of the five coding tables the codeword is from. A decoder 504 is coupled to the codeword recognizer 502 and determines the data for the codeword recognized by the codeword recognizer, e.g., the runlength of non-zeroes, the runlength of zeroes, the sign, etc. . In one embodiment, the decoder 504 includes a lookup device that looks up the appropriate decoding table stored in a memory 506. That table provides the events for at least some of the codewords of the set of codewords. Other codewords may include an escape code, so that decoding is by other than a table lookup method. In one embodiment, the bitstream is stored in a buffer 508, and the output of the buffer is coupled to the codeword recognizer.

While in the embodiment shown in FIG. 5, the memory is shown separate from the lookup device, those in the art will understand that in other embodiments, the lookup device includes memory for the tables, and such other embodiments are included herein.

Note that in FIG. 4, the event recognizer and also the lookup device may each be implemented on a computer as a set of instructions stored in a memory, e.g., the memory 406, that instruct one or more processors to carry out the operations of the recognition and of the lookup.

Note further that in FIG. 4, the codeword recognizer and also the lookup device may each implemented on a computer as a set of instructions stored in a memory, e.g., the memory 406, that instruct one or more processors to carry out the operations of the recognition and of the lookup.

Figure 6:
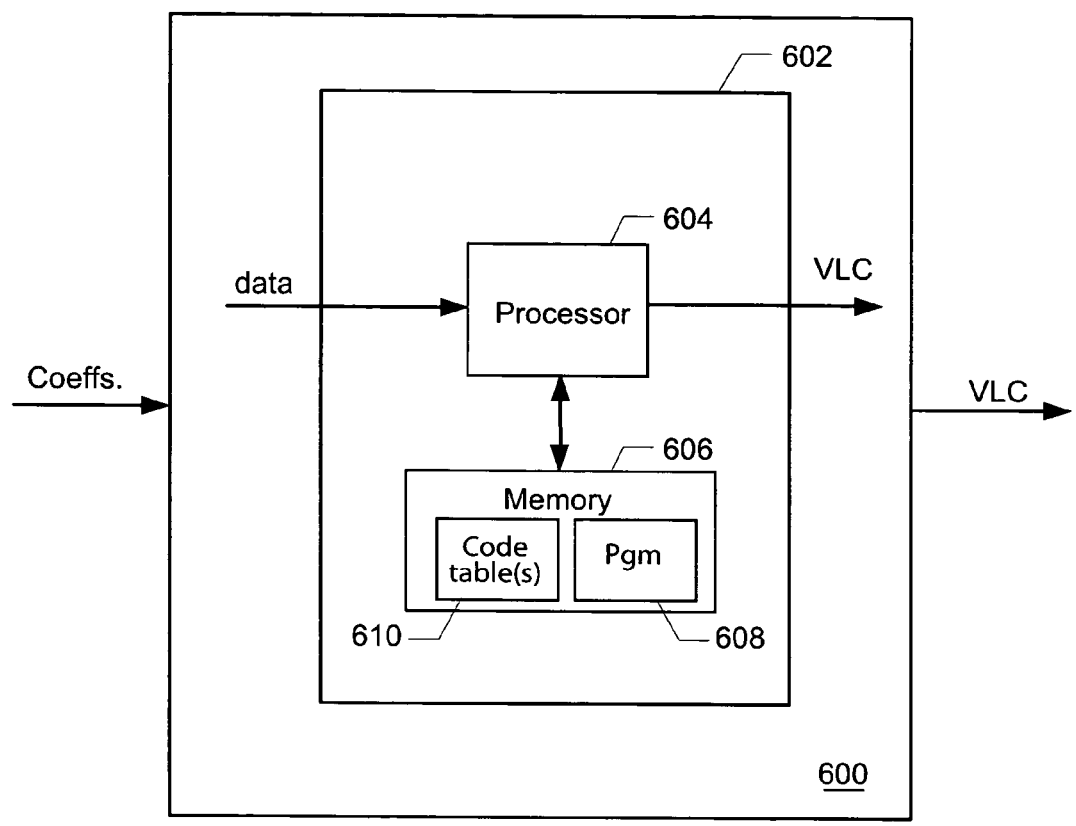
FIG. 6 shows an alternate coding apparatus that includes a processing system and a memory according to an embodiment of the invention.

Yet another apparatus embodiment is shown in FIG. 6 as apparatus 600 that includes processing system 602 that includes one or more processors 604 and a memory 606. A single processor is shown in FIG. 6 and those in the art will appreciate that this may represent several processors. Similarly, a single memory subsystem 606 is shown, and those in the art will appreciate that the memory subsystem may include different elements such as RAM, ROM, and so forth. In addition, the memory subsystem is meant to include any non-volatile memory storage such as a magnetic or optical storage component. A computer program 608 is included and is loaded into the memory 606. Note that at any time, some of the program may be in the different parts of the memory subsystem, as will be understood by those in the art. The program 608 includes instructions to instruct the processor to implement, in different versions, the different coding methods described above. The processor thus accepts as data the ordered coefficients and generates the codewords. The apparatus 600 further includes in the memory subsystem 606 a coding data structure 610 that provides the codewords for sets of one or more coefficients as described in any one of the novel coding methods described herein. In one embodiment, the data structure is in the form of one or more tables.

Figure 7:
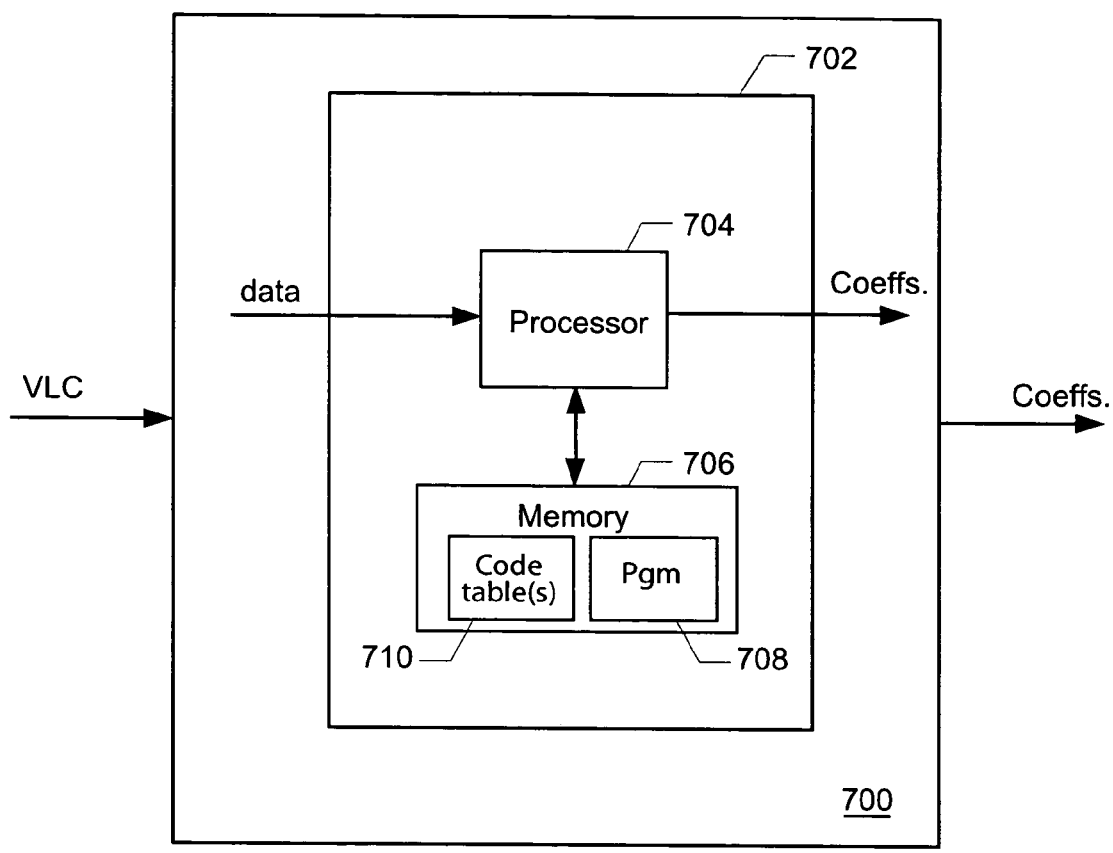
FIG. 7 shows an alternate decoding apparatus that includes a processing system and a memory according to an embodiment of the invention.

Yet another apparatus embodiment is shown in FIG. 7 as decoding apparatus 700 that includes processing system 702 that includes one or more processors 704 and a memory 706. A single processor is shown in FIG. 7 and those in the art will appreciate that this may represent several processors. Similarly, a single memory subsystem 706 is shown, and those in the art will appreciate that the memory subsystem may include different elements such as RAM, ROM, and so forth. In addition, the memory subsystem is meant to include any non-volatile memory storage such as a magnetic or optical storage component. A computer program 708 is included and is loaded into the memory 706. Note that at any time, some of the program may be in the different parts of the memory subsystem, as will be understood by those in the art. The program 708 includes instructions to instruct the processor to implement, in different versions, the different decoding methods described above. The processor thus accepts as data the codewords that are generated by any of the coding methods described above, and generates the series of quantized transform coefficients. The apparatus 700 further includes in the memory subsystem 706 a coding data structure 710 that provides the events of one or more coefficients for the different codewords as described in any one of the novel coding methods described herein. In one embodiment, the data structure is in the form of one or more tables.

Note that neither FIG. 6 nor FIG. 7 show details such as bus structures, I/O structures, etc., that may be included since the need for such structures would be known to those in the art and their inclusion would only obscure the inventive aspects of the apparatus. Furthermore, the processing system may be implemented using one or more a general purpose microprocessors, one or more nicrocontrollers that includes several memory and other elements, one or more DSP devices, or any other programmable processors. Furthermore, the processors may be standalone devices, or may be implemented as "cores" to be included in an ASIC, gate array, or other device.

Another aspect of the invention is a memory (such as memory 406 in FIG. 4 or memory 606 in FIG. 6) that stores a coding data structure that provides the codewords for sets of one or more coefficients as described in any one of the novel coding methods described herein. In one embodiment, the data structure is in the form of one or more tables.

Another aspect of the invention is a memory (such as memory 506 in FIG. 5 or memory 706 in FIG. 7) that stores a decoding data structure that provides the data for any set of codewords recognized in a bitstream of compressed image data. The bitstream is coded by any one of the novel coding methods described herein. In one embodiment, the data structure is in the form of one or more tables.

Thus, a variable length coding method and apparatus has been described suitable for encoding the quantized transform coefficients of blocks of images as occur in common image compression methods.

One embodiment of the present invention uses five independent tables: two runlength code tables for the coding methods of the first and second kinds, and a first amplitude code table for use in the first region, and another runlength code table for the coding method of the third kind, and a second amplitude code table for use in the second region.

One embodiment of each of the methods described herein is in the form of a computer program that executes on a processing system, e.g., a one or more processors that are part of an image coder or decoder, as appropriate. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in some of the above examples for amplitude encoding, 63 possible non-zero values are assumed for the coefficients, the invention is not restricted to any number of possible quantization values.

Note also that the term amplitude is irrespective of sign. Therefore, for example, coefficient of values +1 and −1 both have amplitude 1.

In the embodiments described above, the forming of the codeword includes an indication of the sign of any non-zero coefficients. In one version, the sign information for any runs of non-zero amplitudes in the first region is added together with the information of each amplitude. In an alternate embodiment, the sign information for any runs of non-zero amplitudes in the first region may be included in a different manner, e.g., as a code for the series of signs. Other alternate embodiments are also possible for encoding the sign.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method for processing an ordered series of digital signals that each have an amplitude from a finite set of amplitudes consisting of the most-likely-to-occur amplitude and at least one other amplitude, the processing to reduce the amount of data used to represent the digital signals and to form codewords such that the more likely to occur sequences of values of digital signals are represented by relatively short codewords and the less likely to occur sequences of values of digital signals are represented by relatively long codewords, the method comprising:

for each run of consecutive signals of value or values other than the most-likely-to-occur value occurring in a first contiguous region defined by a breakpoint along the ordering of the series, encoding the runlength of the consecutive signals using a first runlength coding method, and forming a codeword that encodes the runlength using the first runlength coding method and further encodes the amplitudes and signs of each signals in the run, the breakpoint defining the first continuous region and a second contiguous region following the first contiguous region;

for each run of consecutive signals of the most-likely-to-occur value occurring in the first region defined by the breakpoint, encoding the runlength of the consecutive signals of the most-likely-to-occur value using a second runlength coding method; and encoding the signals occurring in the second region defined by the breakpoint, the encoding using a second-region coding method, the second-region coding method including identifying events that include runs of consecutive signals of the most-likely-to-occur value in the second region that end in a single signal having other than the most-likely-to-occur value, and encoding said identified events in the second region using a third coding method, the encoding including indicating that the ending single signal has an amplitude other than the next most-likely-to-occur value to the most-likely-to-occur value, wherein the first, second, and third coding methods include variable length codes such that relatively short codewords are formed to represent sequences of values that are relatively more likely to occur, and relatively long codewords are formed to represent sequences of values that are relatively less likely to occur, and wherein:

the breakpoint value is selected from a finite set of predefined breakpoint values according to which of the breakpoints of the set produces the shortest number of bits, or the breakpoint defines a soft boundary between the first and second regions, such that for a block having a sequence of consecutive values all having the most-likely-to-occur value or all having other than the most-likely-to-occur value crosses the breakpoint, the boundary between the first and second region is at the end of the sequence such that the whole sequence is in the first region.

2. A method as recited in claim 1, wherein the series of digital signals is a series of quantized coefficients of a transformed block of image data, the transform such that the most-likely-to-occur amplitude is 0, and the next most-likely-to-occur amplitude is 1.

3. A method as recited in claim 2, wherein the series is divided into more than two regions by the breakpoint and an additional breakpoint for each region in addition to the second region, the method further comprising:

encoding the signals occurring in each additional regions defined by the corresponding additional breakpoint, the encoding using a coding method different from the coding methods used in other regions.

4. A method as recited in claim 2, wherein the third coding method includes encoding runlengths of consecutive zero-valued coefficients that end in an amplitude-1 coefficient using a third variable length runlength coding method, the method further comprising:

identifying events that include runs of consecutive amplitude-zero coefficients in the second region that end in a single coefficient having an amplitude greater than 1;

further using the third coding method together with an exception code to encode the identifying events that end in a coefficient having an amplitude greater than 1;

encoding the signs of the non-zero-valued coefficients;

encoding the amplitudes of the non-zero-valued coefficients in the first region; and encoding the amplitudes greater than 1 in the second region.

5. A method as recited in claim 2, wherein the breakpoint defines a soft boundary and has a pre-selected value.

6. A method as recited in claim 5, wherein the method is applicable to intraframe image data and to interframe blocks of image data, and wherein a first pre-selected breakpoint value is used for intraframe image data and a second first pre-selected breakpoint value is used for interframe image data.

7. A method as recited in claim 2, wherein the breakpoint defines the soft boundary between the first and second regions, such that for a block having a sequence of consecutive non-zero values or consecutive zero values that crosses the breakpoint, the boundary between the first and second region is at the end of the sequence such that the whole sequence is in the first region.

8. A method as recited in claim 2, further comprising the step of:

forming fixed length codewords for at least some of the runlengths.

9. A method as recited in claim 8, wherein the first runlength coding method includes forming fixed length codewords for at least some of the runlengths in the first region.

10. A method as recited in claim 8, wherein the second runlength coding method includes forming fixed length codewords for at least some of the runlengths in the first region.

11. A method as recited in claim 8, wherein the third coding method includes forming fixed length codewords for at least some of the runlengths in the second region.

12. A method as recited in claim 8, wherein the runlengths for which the fixed codewords are formed are less likely to occur than the runlengths for which a variable length codeword is used, and wherein the fixed length codewords are at least as long as any variable length codeword.

13. A method as recited in claim 8, wherein each fixed length codeword includes an escape code.

14. A method as recited in claim 2, wherein the first coding method includes a codeword for the runlength of non-zero-values coefficients, and a set of codewords for the amplitudes and signs of the non-zero-valued coefficients in each run.

15. A method as recited in claim 2, wherein the codewords for the coefficients in the first region start with a codeword of the first coding method and alternate between the first coding method and the second coding method, and wherein one of the codewords of the first coding method is a particular codeword to indicate that the first run encountered is a run of zeroes such that a codeword of the second method follows the particular codeword of the first method.

16. A method as recited in claim 2, wherein codewords are also generated for the amplitudes and signs of each of the non-zero-valued coefficients of amplitude greater than 1 in the second region.

17. A method as recited in claim 2, wherein a first runlength code table, a second runlength code table, and a first amplitude code table are provided for coding information in the first region, wherein the first runlength code table is for storing a plurality of codewords for a set of runlengths of non-zero valued coefficients, the first table organized such that the more likely-to-occur runlengths have shorter codewords than the less likely-to-occur runlengths, wherein the second runlength code table is for storing a plurality of codewords for a set of runlengths of zero valued coefficients, the second table organized such that the more likely-to-occur runlengths have shorter codewords than the less likely-to-occur runlengths, wherein the first amplitude code table is for storing a plurality of codewords for the amplitudes of the coefficients in each runlength of non-zero-valued coefficients, wherein the step of forming a codeword for each runlength of non-zero valued coefficients includes looking up the first runlength code table, and further includes looking up the first amplitude code table for each non-zero coefficient in the runlength of non-zero coefficients, and wherein the step of forming a codeword for each runlength of zero valued coefficients in the first region includes looking up the second runlength code table.

18. A method as recited in claim 17, wherein a third runlength code table and a second amplitude code table are provided for coding information in the second region, wherein the third runlength code table is for storing a plurality of codewords for a set of runlengths of zero valued coefficients that end in an amplitude-one coefficient and that occur in the second region, the third table organized such that the more likely-to-occur runlengths have shorter codewords than the less likely-to-occur runlengths, wherein the second amplitude code table is for storing a plurality of codewords for the amplitudes greater than 1 of non-zero coefficients that occur in the second region, and wherein the step of forming a codeword for each runlength of zero valued coefficients that ends in a non-zero-valued coefficient in the second region includes looking up the third runlength code table.

19. A method as recited in claim 2, wherein the forming of codewords for each runlength is fixed based on assumed a priori likelihood of occurrence of the events.

20. A method as recited in claim 2, wherein the forming of codewords for each event is changeable according to actual statistical data collected from the series of digital values.

21. A method as recited in claim 2, further comprising:

forming an indication for when all the remaining digital signals in the second region of the series have the zero amplitude.

22. A method as recited in claim 1, wherein the breakpoint value is the value selected from the finite set of pre-defined breakpoint-values.

23. A method as recited in claim 22, wherein the breakpoint defines a hard boundary between the first and second regions.

24. A method for processing an ordered series of digital signals that each have an amplitude from a finite set of amplitudes consisting of the most-likely-to-occur amplitude and at least one other amplitude, the processing to reduce the amount of data used to represent the digital signals and to form codewords such that the more likely to occur sequences of values of digital signals are represented by relatively short codewords and the less likely to occur sequences of values of digital signals are represented by relatively long codewords, the method comprising:

for each run of consecutive signals of value or values other than the most-likely-to-occur value occurring in a first contiguous region defined by a breakpoint along the ordering of the series, encoding the runlength of the consecutive signals using a first runlength coding method, and forming a codeword that encodes the runlength using the first runlength coding method and further encodes the amplitudes and signs of each signals in the run, the breakpoint defining the first continuous region and a second contiguous region following the first contiguous region;

for each run of consecutive signals of the most-likely-to-occur value occurring in the first region defined by the breakpoint, encoding the runlength of the consecutive signals of the most-likely-to-occur value using a second runlength coding method; and encoding the signals occurring in the second region defined by the breakpoint, the encoding using a second-region coding method, the second-region coding method including identifying events that include runs of consecutive signals of the most-likely-to-occur value in the second region that end in a single signal having other than the most-likely-to-occur value, and encoding said identified events in the second region using a third coding method, the encoding including indicating that the ending single signal has an amplitude other than the next most-likely-to-occur value to the most-likely-to-occur value, wherein the first, second, and third coding methods include variable length codes such that relatively short codewords are formed to represent sequences of values that are relatively more likely to occur, and relatively long codewords are formed to represent sequences of values that are relatively less likely to occur, wherein the method is applicable to interframe blocks of image data, and wherein a first pre-selected breakpoint value is used for interframe image data of a first kind, and a second pre-selected breakpoint value is used for interframe image data of a second kind.

25. A method as recited in claim 24, wherein the first kind of interframe coding is of a higher bit rate than the second kind of interframe coding.

26. A method of image compression comprising:

dividing an image into blocks; and for each block:

transforming the block to form transform coefficients for the block;

quantizing the transform coefficients of the block;

ordering the quantized coefficients of the block along a two-dimensional path to form an ordered series of quantized transform coefficients;

forming events from the series of quantized transform coefficients, each event being a run of non-zero-valued coefficients in a first contiguous region defined by a breakpoint, a run of zero-valued coefficients in the first region, or a run of zero-valued coefficients in a second region defined by the breakpoint, the breakpoint defining the first region and a second continuous region in the series following the first region;

forming a codeword for each runlength of non-zero-valued coefficients in the first region, the forming a codeword according to a first coding method;

forming a codeword for each runlength of zero-valued coefficients in the first region, the forming a codeword according to a second coding method; and encoding the coefficient values in the second region according to a third coding method, the third coding method including identifying runs of zero-valued coefficients that end in a single non-zero-amplitude coefficient in the second region, such that relatively short codewords are formed to represent runlengths that are relatively more likely to occur, and relatively long codewords are formed to represent runlengths that are relatively less likely to occur, wherein:
the breakpoint value is selected from a finite set of predefined breakpoint values according to which of the breakpoints of the set produces the shortest number of bits,
or
the breakpoint defines a soft boundary between the first and second regions, such that for a block having a sequence of consecutive values all being zero or all being non-zero crosses the breakpoint, the boundary between the first and second region is at the end of the sequence such that the whole sequence is in the first region.

27. A method as recited in claim 26,
wherein the third coding method includes encoding runlengths of consecutive zero-valued coefficients that end in non-zero-valued coefficient using a third variable length runlength coding method, encoding that a runlength of consecutive zero-valued coefficients ends in a coefficient having an amplitude greater than one, and further encoding the amplitudes and signs of non-zero-valued coefficients that have amplitude greater than one.

28. A method as recited in claim 26, wherein the breakpoint defines a soft boundary and has a pre-selected value.

29. A method as recited in claim 28, wherein the method is to interframe blocks of image data.

30. A method as recited in claim 26, wherein the breakpoint value is the value selected from the finite set of pre-defined breakpoint values.

31. A method as recited in claim 26, wherein the breakpoint value is selcted from the finite set of pre-defined breakpoint values according to an image-dependent criterion, and wherein the breakpoint defines a hard boundary between the first and second regions.

32. A method as recited in claim 26, wherein the breakpoint defines the soft boundary between the first and second regions, such that for a block having a sequence of consecutive non-zero values or consecutive zero values that crosses the breakpoint, the boundary between the first and second region is at the end of the sequence such that the whole sequence is in the first region.

33. A method as recited in claim 26, further comprising the step of:
forming fixed length codewords for at least some of the runlengths.

34. A method as recited in claim 33, wherein the first runlength coding method includes forming fixed length codewords for at least some of the runlengths in the first region.

35. A method as recited in claim 33, wherein the second coding method includes forming fixed length codewords for at least some of the runlengths in the first region.

36. A method as recited in claim 33, wherein the third coding method includes forming fixed length codewords for at least some of the runlengths in the second region.

37. A method as recited in claim 33, wherein the runlengths for which the fixed codewords are formed are less likely to occur than the runlengths for which a variable length codeword is used, and wherein the fixed length codewords are at least as long as any variable length codeword.

38. A method as recited in claim 33, wherein each fixed length codeword includes an escape code.

39. A method as recited in claim 26, wherein the first coding method includes a codeword for the runlength of non-zero-values coefficients, and a set of codewords for the amplitudes and signs of the non-zero-valued coefficients in each run.

40. A method as recited in claim 26, wherein the codewords for the coefficients in the first region start with a codeword of the first coding method and alternate between the first coding method and the second coding method, and wherein one of the codewords of the first coding method is a particular codeword to indicate that the first run encountered is a run of zeroes such that a codeword of the second method follows the particular codeword of the first method.

41. A method as recited in claim 26,
wherein a first runlength code table, a second runlength code table, and a first amplitude code table are provided for coding information in the first region,
wherein the first runlength code table is for storing a plurality of codewords for a set of runlengths of non-zero valued coefficients, the first table organized such that the more likely-to-occur runlengths have shorter codewords than the less likely-to-occur runlengths,
wherein the second runlength code table is for storing a plurality of codewords for a set of runlengths of zero valued coefficients, the second table organized such that the more likely-to-occur runlengths have shorter codewords than the less likely-to-occur runlengths,
wherein the first amplitude code table is for storing a plurality of codewords for the amplitudes of the coefficients in each runlength of non-zero-valued coefficients,
wherein the step of forming a codeword for each runlength of non-zero valued coefficients includes looking up the first runlength code table, and further includes looking up the first amplitude code table for each non-zero coefficient in the runlength of non-zero coefficients, and
wherein the step of forming a codeword for each runlength of zero valued coefficients in the first region includes looking up the second runlength code table.

42. A method as recited in claim 41, wherein
wherein a third runlength code table and a second amplitude code table are provided for coding information in the second region,
wherein the third runlength code table is for storing a plurality of codewords for a set of runlengths of zero valued coefficients that end in a non-zero-amplitude coefficient that occur in the second region, with a codeword indicating that the non-zero-amplitude coefficient that follows the runlength is greater than 1, the third table organized such that the more likely-to-occur runlengths have shorter codewords than the less likely-to-occur runlengths,
wherein the second amplitude code table is for storing a plurality of codewords for the amplitudes of non-zero coefficients that are greater than 1 and that occur in the second region, and
wherein the step of forming a codeword for each runlength of zero valued coefficients that ends in a non-zero-amplitude coefficient in the second region includes looking up the third runlength code table.

43. A method as recited in claim 26, wherein the forming of codewords for each runlength is fixed based on assumed a priori likelihood of occurrence of the events.

44. A method as recited in claim 26, wherein the forming of codewords for each event is changeable according to actual statistical data collected from the series of digital values.

45. A method as recited in claim 26, further comprising:
forming an indication for when all the remaining digital signals in the second region of the series have the zero amplitude.

46. An apparatus to encode an ordered series of quantized coefficients of a transform of a block of image data, the transform such that 0 is the most likely coefficient applitude and 1 is the next most likely coefficient amplitude, the apparatus comprising:

means for forming non-zero-amplitude events in a first contiguous region of the series of quantized transform coefficients, the first region defined by a breakpoint defining a first and a second contiguous regions region following the first region, each non-zero-amplitude event defined by the runlength of a run of non-zero-valued coefficients and by the values of the non-zero coefficients;

means for forming zero-amplitude events in the first region of the series of quantized transform coefficients, each zero-amplitude event defined by the runlength of zero-valued coefficients;

means for forming a codeword for each formed non-zero-amplitude event according to a first runlength coding method and codewords for the non-zero amplitudes in the event according to a first amplitude coding method;

means for forming a codeword for each formed zero-amplitude event in the first region according to a second runlength coding method and a first amplitude coding method;

means for forming events of consecutive zero-amplitudes that end in a single non-zero amplitude from the second region of the series of quantized transform coefficients;

means for forming a codeword for each formed consecutive zero-amplitudes ending in a non-zero-amplitude event in the second region according to a third runlength coding method, including forming a codeword to indicate that the single non-zero amplitude is greater than 1; and means for forming a codeword for each non-zero amplitude greater than 1 in the second region according to a second amplitude coding method, such that relatively short codewords are formed to represent events that are relatively more likely to occur, and relatively long codewords are formed to represent events that are relatively less likely to occur, wherein:

the breakpoint value is selected from a finite set of predefined breakpoint values according to which of the breakpoints of the set produces the shortest number of bits, or the breakpoint defines a soft boundary between the first and second regions, such that for a block having a sequence of consecutive values all being zero or all being non-zero crosses the breakpoint, the boundary between the first and second region is at the end of the sequence such that the whole sequence is in the first region.

47. An apparatus as recited in claim 46, wherein the means for forming the codeword includes:

means for storing a table for each of the first, second, and third runlength coding methods, and for storing a table for the first and second amplitude coding methods; and means for looking up each of the tables according to the coding method.

48. An apparatus as recited in claim 46, wherein at least one of the means for forming codewords forms fixed length codewords for at least some of the events.

49. An apparatus as recited in claim 48, wherein each fixed length codeword includes an escape code.

50. An apparatus to encode an ordered series of quantized coefficients comprising:

an event recognizer to recognize runs of consecutive zero-amplitude coefficients and runs of consecutive non-zero-amplitude coefficients in a first contiguous region of the series defined by a breakpoint in the ordering, the breakpoint defining the first contiguous and a second contiguous region following the first region in the series, the event recognizer further to recognize runs of consecutive zero-amplitude coefficients that end in a non-zero amplitude coefficient in the second region, the recognizer forming the runlengths of the zero and non-zero amplitudes in the first region, the non-zero amplitudes in the non-zero runs in the first region, the runlengths of zero-amplitudes ending in a non-zero-amplitude in the second region, and the non-zero amplitudes in the second region; and an encoder coupled to the event recognizer, the encoder accepting and forming a codeword for each of the runlengths of non-zero-amplitudes in the first region, for each of the runlengths of zero-amplitudes in the first region, for each of the non-zero amplitudes in the first region, and further encoding the runlengths of zero-amplitudes that end in a non-zero-amplitude coefficient in the second region, including a codeword to indicate that that non-zero amplitude is greater than 1, and the non-zero amplitude greater than 1 in the second region, such that the apparatus forms relatively short codewords to represent combinations that are relatively more likely to occur, and relatively long codewords to represent combinations that are relatively less likely to occur, wherein:

the breakpoint value is selected from a finite set of predefined breakpoint values according to which of the breakpoints of the set produces the shortest number of bits, or the breakpoint defines a soft boundary between the first and second regions, such that for the block having a sequence of consecutive values all being zero or all being non-zero crosses the breakpoint, the boundary between the first and second region is at the end of the sequence such that the sholw sequence is in the first region.

51. An apparatus as defined in claim 50, wherein the encoder is a lookup device coupled to the event recognizer and determining the codeword for at least some of the events by looking up tables of codewords for recognized events, the tables stored in a memory.

52. An apparatus as recited in claim 50, wherein the encoder forms fixed length codewords for at least some of the events.

53. An apparatus as recited in claim 52, wherein each fixed length codeword includes an escape code.

54. An apparatus as recited in claim 50, wherein the event recognizer further forms an indication for when all the remaining coefficients in the series have amplitude 0.

55. A method to decode a bitstream in order to form a series of quantized coefficients of a transform of a block of image data, the transform such that 0 is the most likely coefficient amplitude and 1 is the next most likely coefficient amplitude, the bitstream encoded by a method that includes:

recognizing events in a first contiguous region of the series defined by a breakpoint in the ordering, the breakpoint defining the first contiguous and a second contiguous region following the first region in the series, the events including runs of consecutive zero-amplitude coefficients and runs of consecutive non-zero-amplitude coefficients in the first region, the recognizing including forming runlengths of recognized runs;

recognizing events that are runs of consecutive zero-amplitude coefficients that end in a single non-zero-amplitude in the second region; the recognizing including forming runlengths of recognized runs and an indication of the exception of the ending non-zero-valued coefficient having an amplitude other than 1; and forming a codeword for each of the runlengths of non-zero-amplitudes in the first region using a first runlength coding method, for each of the runlengths of zero-amplitudes in the first region using a second runlength coding method, for each of the non-zero amplitudes in the first region using a first amplitude coding method, and further forming codewords for the runlengths of zero-amplitudes that end in a non-zero-amplitude coefficient in the second region, with a codeword to indicate that the ending non-zero-amplitude is greater than 1 and a codeword for the non-zero amplitude greater than 1 in the second region, such that the encoding method forms relatively short codewords to represent combinations that are relatively more likely to occur, and relatively long codewords to represent combinations that are relatively less likely to occur, the decoding method comprising:
recognizing a codeword;
determining the event represented by the recognized codeword; and
determining the sub-series of coefficients of each determined event, until all coefficients in the series are determined, wherein:
the breakpoint value is selected from a finite set of predefined breakpoint values according to which of the breakpoints of the set produces the shortest number of bits,
or
the breakpoint defines a soft boundary between the first and second regions, such that for a block having a sequence of consecutive values all being zero or all being non-zero crosses the breakpoint, the boundary between the first and second region is at the end of the sequence such that the whole sequence is in the first region.

56. A method as recited in claim 55, wherein a first coding table is provided containing a plurality of codewords for at least some of the runlengths of non-zero-valued coefficients in the first region, wherein a second coding table is provided containing a plurality of codewords for at least some of the runlengths of zero-valued coefficients in the first region, and wherein the determining of the event for a recognized codeword includes looking up the first or the second table.

57. A method as recited in claim 55, wherein the encoding method is such that fixed length codewords are used to represent a subset of the events.

58. A method as recited in claim 57, wherein each fixed length codeword includes an escape code.

59. An apparatus to decode a bitstream encoded by a coding method, the apparatus comprising:
a codeword recognizer to accept the bits of the bitstream and recognize a codeword of a set of possible codewords that each represent an event; and
a decoder coupled to the codeword recognizer to determine the event for the codeword recognized by the codeword recognizer,
wherein each event that is coded by a set of codewords in the bitstream in a first region defined by a breakpoint is a run of non-zero-valued coefficients coded by a first runlength coding method and a first amplitude coding method, or a run of non-zero-valued coefficients coded by a second runlength coding method, and
wherein each event coded in a second region defined by the breakpoint is a run of none or more zero-valued coefficients that end in a non-zero-valued coefficient coded by a third runlength method, including a codeword to indicate that the ending non-zero-amplitude coefficient has amplitude greater than 1 and a codeword for the non-zero amplitude greater than 1, the amplitude greater than 1 coded by a second amplitude coding method, the breakpoint defining the first region of contiguous coefficients and the second region following the first region,
the first, second, and third coding methods being such that relatively short codewords in the bitstream represent events that are relatively more likely to occur, and relatively long codewords represent events that are relatively less likely to occur, wherein:
the breakpoint value is selected from a finite set of predefined breakpoint values according to which of the breakpoints of the set produces the shortest number of bits,
or
the breakpoint defines a soft boundary between the first and second regions, such that for a block having a sequence of consecutive values all being zero or all being non-zero crosses the breakpoint, the boundary between the first and second region is at the end of the sequence such that the whole sequence is in the first region.

60. An apparatus as recited in claim 59, wherein the decoder is a lookup device that looks up a table stored in a memory, the table providing the event for at least some of the codewords of the set of codewords.

61. An apparatus as recited in claim 59, wherein fixed length codewords are used to represent a subset of the events that are represented by codewords in the bitstream.

62. An apparatus as recited in claim 61, wherein each fixed length codeword includes an escape code.

63. A computer readable medium having instructions coded thereon that when executed by at least one processor cause execution of a method to encode an ordered series of quantized coefficients, at least one of the at least one processor including a memory configured to store a data structure, the method comprising:
forming codewords for a set of events formed from an ordered series of quantized transform coefficients of a block of image data, wherein the data structure provides the codewords for the set of events formed from the ordered series of quantized transform coefficients, such that the forming of the codewords includes looking up the data structure,
wherein an event of the first kind in a first region defined by a breakpoint is a run of non-zero-valued coefficients, an event of the second kind in the first region defined by the breakpoint is a run of zero-valued coefficients, and an event of the third kind in a second region defined by the breakpoint is a run of zero-valued coefficients that ends in a non-zero-valued coefficient in the second region, with an indication of the non-zero-valued coefficient being other than 1,
wherein the breakpoint defines a first region of contiguous coefficients of the series, and an immediately following second region of contiguous coefficients,
such that relatively short codewords in the data structure stored in the memory represent events that are relatively more likely to occur, and relatively long codewords represent events that are relatively less likely to occur, and wherein:
the breakpoint value is selected from a finite set of predefined breakpoint values according to which of the breakpoints of the set produces the shortest number of bits, or
> the breakpoint defines a soft boundary between the first and second regions, such that for a block having a sequence of consecutive values all being zero or all being non-zero crosses the breakpoint the boundary between the first and second region is at the end of the sequence such that the whole sequence is in the first region.

64. A computer readable medium as recited in claim 63, wherein the data structure is in the form of at least three tables including a first runlength table providing the codeword for the runlength of events of the first kind, a second runlength table providing the codeword for the runlength of events of the second kind, and a third runlength table providing the codeword for the runlength of events of the third kind.

65. A method of encoding an ordered series of quantized coefficients of a transform of a block of image data, the method comprising:
> providing a breakpoint to define a first contiguous region of more than one coefficient along the ordering of the series followed by a second continuous region;
> encoding the ordered sub-series of quantized coefficients in the first region, including using a first variable length coding method; and
> encoding the ordered sub-series of quantized coefficients in the second region, including using a second variable length coding method,
> wherein the first and second variable length coding methods are such that the encoding of at least some of the coefficients in the first region is different than the encoding of at least some of the coefficients in the second region, and wherein:
> the breakpoint value is selected from a finite set of predefined breakpoint values according to which of the breakpoints of the produces the shortest number of bits or
> the breakpoint defines a soft boundary between the first and second region, such that for a block having a sequence of consecutive values all being zero or all being non-zero crosses the breakpoint, the boundary between the first and second region is at the end of the sequence such that the whole sequence is in the first region.

* * * * *

UNITED STATES PATENT AND TRADEMARK OFFICE
CERTIFICATE OF CORRECTION

PATENT NO. : 7,483,584 B2  
APPLICATION NO. : 10/898654  
DATED : January 27, 2009  
INVENTOR(S) : Chen et al.

It is certified that error appears in the above-identified patent and that said Letters Patent is hereby corrected as shown below:

In column 11, line 48, kindly replace "$S_{31}$" with -- $S_{\_}$ --

In column 28, line 13, kindly insert --set-- between "breakpoints of the" and "produces the shortest number"

Signed and Sealed this

Eighteenth Day of May, 2010

David J. Kappos  
*Director of the United States Patent and Trademark Office*